United States Patent [19]
Lee

[11] Patent Number: 5,156,872
[45] Date of Patent: Oct. 20, 1992

[54] JUICE EXTRACTOR

[76] Inventor: Moon H. Lee, 17/3 Sajik 1-Dong, Dongrae-Gu Busan, Rep. of Korea

[21] Appl. No.: 827,431

[22] Filed: Jan. 29, 1992

[30] Foreign Application Priority Data

| Feb. 13, 1991 [KR] | Rep. of Korea | 91-2168 |
| Feb. 22, 1991 [KR] | Rep. of Korea | 91-2911 |
| Feb. 28, 1991 [KR] | Rep. of Korea | 91-3304 |

[51] Int. Cl.$^5$ .................. A23L 1/212; A23L 2/06; A23N 1/00
[52] U.S. Cl. .................. 426/489; 99/495; 99/510; 99/513; 100/37; 100/98 R; 100/117; 100/145; 241/101.2; 241/260.1; 241/261; 366/84; 366/272; 366/301; 426/481
[58] Field of Search .................. 99/495, 509–513, 99/348; 100/37, 53, 98 R, 117, 145, 121; 241/92, 101.1, 101.2, 260.1, 261; 366/83–85, 272, 297, 301; 426/481, 482, 489, 518, 616, 51

[56] References Cited

U.S. PATENT DOCUMENTS

| 244,961 | 7/1881 | Wenzel | 99/510 |
| 2,119,162 | 5/1938 | Hartner | 99/495 |
| 3,533,563 | 10/1970 | Eriksson | 241/251 |
| 3,779,522 | 12/1973 | Loomans | 366/85 |
| 4,025,056 | 5/1977 | Miles et al. | 366/272 |
| 4,073,013 | 2/1978 | Blach | 366/301 |
| 4,643,085 | 2/1987 | Bertocchi | 99/510 |
| 4,774,097 | 9/1988 | Bushman et al. | 426/489 |
| 4,792,294 | 12/1988 | Mowli | 366/85 |
| 4,844,350 | 7/1989 | Larsson | 241/261 |
| 4,846,054 | 7/1989 | Mange et al. | 99/495 |

FOREIGN PATENT DOCUMENTS

| 0329092 | 8/1989 | European Pat. Off. | 366/83 |
| 920465 | 4/1947 | France | 99/510 |
| 0000345 | 6/1979 | PCT Int'l Appl. | 241/261 |
| 0001002 | 11/1979 | PCT Int'l Appl. | 241/260.1 |
| 861413 | 2/1961 | United Kingdom | 366/272 |
| 1084828 | 9/1967 | United Kingdom | 99/510 |

*Primary Examiner*—Timothy F. Simone
*Attorney, Agent, or Firm*—Low and Low

[57] ABSTRACT

An apparatus and method for extracting juice from raw juice containing material is disclosed. The apparatus includes a supporting housing, a pair of meshing helical gears (2,3) for crushing the raw juice containing material to initially extract juice therefrom and with each helical gear terminating in a tapered screw. A sieve (4) is operatively positioned around the helical gears and each of the tapered screws with the sieve being branched (47,48) with each branch housing at least a portion of one of the tapered screws, respectively. Each branch of the sieve has a terminal end with a discharge outlet formed thereat to enable each of the screws to further extract juice from the crushed raw juice containing material by compressingly moving the crushed juice containing material along one of the branch portions of the sieve and toward one of the discharge outlets formed in the sieve. An outlet disc (7) is positioned at the discharge outlets and is biased in a closed position thereby taking advantage of the compressive forces to further squeeze juice from the crushed material until the force tensioning the tensioned outlet disc is overcome and such material is discharged from the housing. A power means (1) supplies rotational output to the helical gears and the tapered screws.

21 Claims, 10 Drawing Sheets

F I G. 13
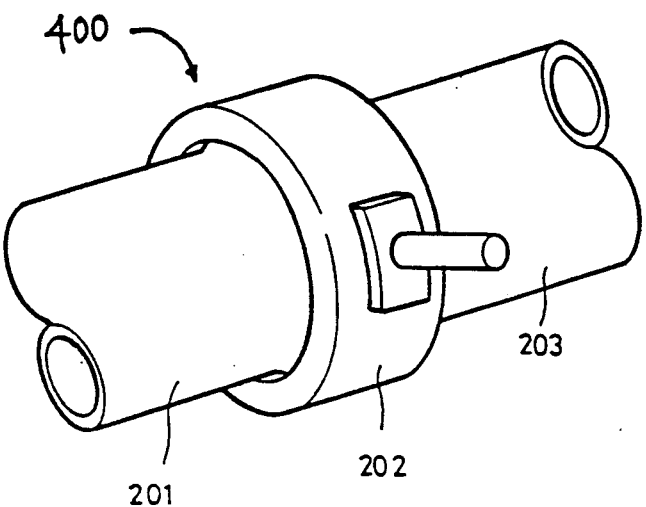
F I G. 14
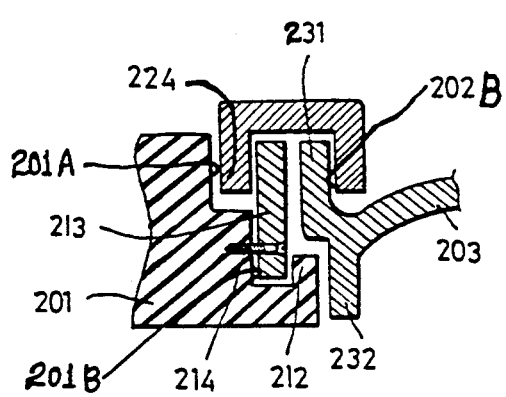
F I G. 15
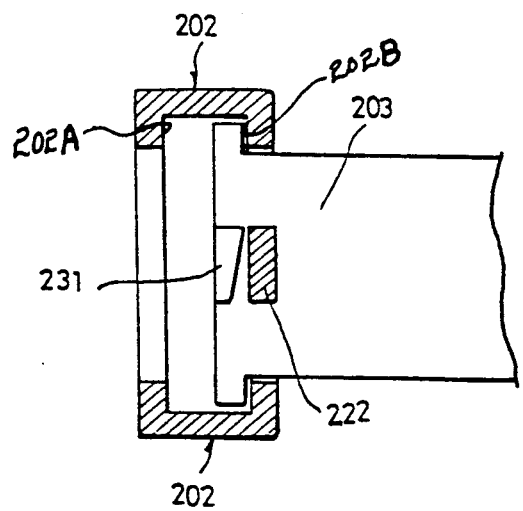

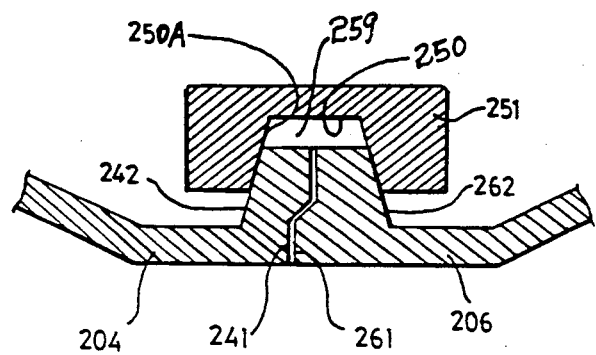
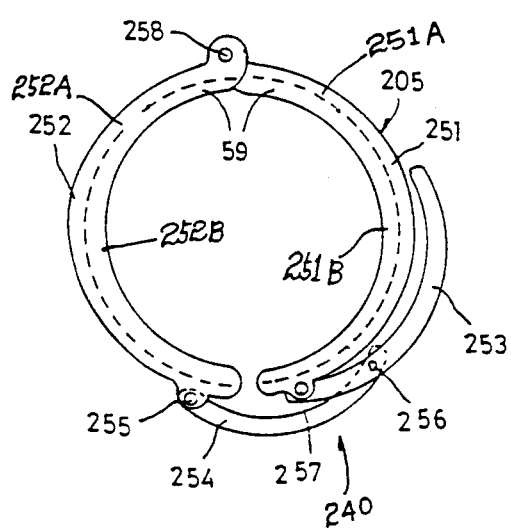 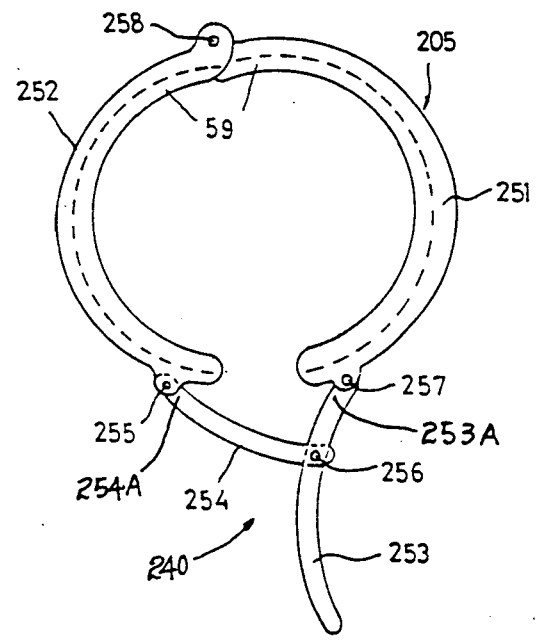

JUICE EXTRACTOR

FIELD OF THE INVENTION

The present invention relates to a method and an apparatus for preparing juice from vegetables, fruits and the like, and more particularly to an improved juice maker apparatus which includes a pair of helical gears for crushing the raw material, two screws connected concentrically to the helical gears, a driving section for rotating the helical gears, a filtering sieve surrounding part of the helical gears and the screws, and a housing for supporting the driving section, the helical gears and the filtering sieve.

BACKGROUND OF THE INVENTION

A juice maker apparatus is disclosed in Korean Utility Model Publication No. 91-4356 which was filed on May 9, 1989 by the present applicant. This device includes two helical gears for crushing fruits or vegetables, screws connected respectively to the shafts of the helical gears, a driving section for supplying driving power to the helical gears, a filtering sieve surrounding part of the helical gears and the screws, and a housing for supporting the driving section, the helical gears and the filtering sieve.

Since this juice maker uses the helical gears of usual form, it can extract the juice from a source material, but it is difficult to crush the fibroid materials, i.e. the fiber of the source material. Further, the filtering sieve which is intended to separate the juice from the dregs, i.e. the juice extracted material, inadequately extracts juice from the dregs. In the event complete extraction is attempted, the resulting juice contains fibroid materials which reduce the eye pleasing attractiveness of the juice.

Further, the manufacturing of the helical gears is a time-consuming process, while there is encountered much difficulty in machining the helical gears. Further, the produced juice can be oxidized depending on the material of the helical gears, and therefore, a need for the improvement of the helical gears came to be felt.

Further, if the working section consisting of the helical gears, the filtering sieve and the housing is to be cleaned by detaching it from the driving section, the detachment and a re-attachment of it is difficult. Further, there is also required a means for closely contacting the two helical gears together.

The present invention is intended to overcome the above described disadvantages of the known juice maker.

Therefore it is the object of the present invention to provide a juice maker which overcomes the disadvantages of the prior art devices.

It is a further object of the present invention to provide a juice maker which efficiently extracts juice from raw juice containing material and separates the extracted juice from the juice extracted material and delivers the extracted juice and the juice extracted material to the outside of the housing to facilitate access to the extracted juice and clean-up.

It is a further object of the present invention to provide a juice extractor which utilizes crushing and compression forces to fully extract juice for raw juice containing material.

It is a further object of the present invention to provide a method of extracting juice from juice containing material.

The juice making method according to the present invention is capable of extracting nutrition from the fibroid materials (fiber of source material) by crushing the fibroid materials utilizing a pair of helical gears.

The juice making method includes the steps of: cutting the raw material by means of the end portions of the teeth of one of the gears, and inserting the cut material into the inter-teeth space of the other gear; compressing the cut raw material within the inter-teeth space and crushing the cut raw materials through the combined function of the end portion of the teeth of one of the gears and pockmark portions of the fillet portions of the other gear. Thus the fibroid materials are crushed, and the nutrition contained in the fibroid materials are extracted together with the juice.

The foregoing has outlined some of the more pertinent objects of the present invention. These objects should be construed to be merely illustrative of some of the more pertinent features and applications of the invention. Many other beneficial results can be obtained by applying the disclosed invention is a different manner or modifying the invention within the scope of the disclosure. Accordingly, other objects and a more thorough understanding of the invention may be had by referring to the summary of the invention and the detailed description describing the preferred embodiment in addition to the scope of the invention defined by the claims taken in conjunction with the accompanying drawings.

SUMMARY OF THE INVENTION

The juice extractor and method of the present invention is defined by the appended claims with a specific embodiment shown in the attached drawings. For the purpose of summarizing the invention, the invention relates to an apparatus for extracting juice from raw juice containing material and which comprises a housing for supporting the apparatus and including a raw juice containing material inlet for permitting raw juice containing material to pass therethrough. A pair of meshing helical gears (2,3) with each helical gear terminating in a tapered screw are used. Each helical gear includes a plurality of teeth each of which extend along the length of the helical gear and terminate proximate the tapered screw. Each helical gear is rotatably secured in the housing to enable in use raw juice containing material to be supplied through the inlet of the housing to the pair of meshing helical gears for crushing the raw juice containing material to initially extract juice therefrom. In the preferred embodiment both of the helical gears and the tapered screw are made of stainless steel having about 3 to 4% bio-ceramic to prevent oxidation and decomposition of the juice during contact with the helical gears. A sieve (4) is operatively positioned around the helical gears and each the tapered screws for enabling in use the filtering and draining away from the helical gears and the tapered screws juice extracted by the helical gears and the tapered screws. Preferably, the sieve is branched (47,48) with each branch housing at least a portion of one of the tapered screws, respectively, and with each branch of the sieve having a terminal end with a discharge outlet formed thereat to enable each the screw to further extract juice from the crushed raw juice containing material by compressingly moving the crushed juice containing material along one of the branch portions of the sieve and toward one of the discharge outlets formed in the sieve. An outlet disc (7) is positioned at each of the terminal ends of each the discharge outlets with the outlet disc tensioned in a closed position. That is the outlet disc is biased in a closed position to close off the discharge outlet. Thus, in use, the tapered screw continually forces the crushed material against the outlet disc which further extracts juice from the crushed material until. Once enough pressure is exerted against the outlet disc, the force tensioning the outlet disc in the closed position give way and open the discharge outlet to enable the discharging of the juice extracted material from the outlet of the housing. A power means (1) supplies rotational output to the helical gears and the tapered screws.

Thus, upon powering the apparatus of the present invention the raw juice containing material supplied through the inlet is crushed and otherwise acted upon by the helical gears to initially extract juice while also being pushed along the helical gears to one of the tapered screws. At the tapered screw the resulting material is pushed along by one of the tapered screws where it is also compressed to further extract juice and is finally discharged through one of the outlets formed in the sieve.

It is preferred that the sieve which is operatively positioned around each the tapered screw include large holes proximate the helical gears, small holes proximate each discharge outlet of the sieve and with medium sized holes therebetween to enable in use the juice extracted raw material to be compressingly moved by each the screw toward the discharge outlet while being retained within the sieve prior to being forced from the discharge outlet while simultaneously allowing juice made available by the compression to drain from the sieve operatively positioned around each the tapered screw. Preferably the taper of the sieve follows the taper of the tapered screws.

The teeth of the helical gear are elongated in structure as illustrated in the figures described below. Further each of the teeth of the plurality of teeth of each the helical gear are preferably formed with a pressure angle of about 28° to 30° and have an addendum and a dedendum which are equal to each other to enable zero clearance between meshing teeth. Moreover each tooth of the plurality of teeth of the helical gears preferably includes an end surface (82) and a fillet portion (83) which are provided with slightly rough surfaces and a plurality of pockmarks in a direction perpendicular to the gear shaft to provide in use enhanced juice extraction by further pulverizing the raw juice containing material.

A blade (6) separates the juice from the juice extracted material (dregs) to enable collection of each outside of the housing. This is particularly valuable where a lot of juice containing raw material is to be processed. The blade has a first side and a second side and is positioned proximate the discharge outlets of the sieve to enable the juice extracted from the juice containing raw material to flow on to the first side of the blade and the juice extracted material discharged from the discharge outlets formed in the sieve to flow on to the second side of the blade thereby separating the juice and the juice extracted material to enable separate collection thereof.

A tensioning means is preferred for variably tensioning the pair of helical gears against one another to enable the helical gears to separate, i.e. move against the tensioning means, when a seed, or the like, enters between the helical gears to protect the helical gears from damage. However, the tensioning means is to force one helical gear toward the other helical gear, until there is left no clearance between the teeth of said two helical gears.

In one embodiment, the tensioning means includes each of the helical gears terminating in a tapered screw having a shaft extending axially from the helical gear and from the tapered screw and with the shafts being rotatably secured in the housing. A first and a second coil spring is tensioned against the shaft extending axially from the helical gear and the shaft extending axially from the tapered screw, respectively. A forcing means tensions or forces each coil spring against the respective shafts extending axially from the helical gear and from the tapered screw. In another embodiment of the tensioning means, the housing includes a pair of internally threaded apertures formed therein to provide access to the shafts extending axially from the helical gear and from the tapered screw, respectively. In this embodiment, the forcing means is a pair of screws with one of the screws being received in one of the internally threaded apertures and with the remaining screw being received into the remaining internally threaded aperture, such that upon rotating the screws, the screws engage the coil springs, respectively, and tension the helical gears together.

In another embodiment of the tensioning means the forcing means is a disc cam with a handle (151), a first stopper face 153 and a second stopper face (152) and with the disc cam being pivotally secured to the housing so as to be in contact with the coil spring such that in use upon pivoting the disc cam from a first position with the first stopper face in contact with the coil spring to a second position with the second stopper face in contact with the coil spring, the coil spring goes from a non-tensioned state to a tensioned state thereby tensioning the helical gears together.

In a further embodiment, the tensioning means includes a pair of rods having a first, second and mid portion with each mid portion of the rods being served to define a pair of parallel sloped surfaces (inclined planes) and with the second portion of each rod being in contact with one of the coil springs and secured in the housing against rotation and with the first portion terminating in a handle, respectively. Thus, in use, upon securing the first portion of the rod to the housing and rotating each handle from a first position to a second position, the sloped surface of the first portion of the rod rotates against the sloped surface of the second portion of the rod pushing the second portion of the rod against the coil spring such that each coil spring is tensioned against one of the shafts extending axially from the helical gear and from the tapered screw, respectively.

The first portion of each of the rods is secured to the housing by a cap with each cap having a hole formed therein for receiving therethrough the handle of one of the shafts, respectively.

In another embodiment of the present invention, the housing is divided into a first section and a second section with the first section including the power means and the second section including the helical gears and with the first section being separable from the second section. The separable structure enables the cleaning of the second section of the housing apart from the first section of the housing. A coupling means is utilized to operatively secure the first section of the housing to the second section of the housing.

In one embodiment, the coupling means includes the first and the second sections of the housing each including a terminal end with each terminal end having a flange formed thereat. A locking ring having a pair of clip portions with each clip portions having an inner surface with a groove formed therein for receiving into the grooves each flange of the first and the second sections of the housing in a side-by-side arrangement. A closing means secures the clip portions together such that in use each flange is received into each groove of each clip portion of the locking ring and forced together to thereby securely interconnect the first section and the second section of the housing together for use in extracting juice. The clip portions each have a first and a second end, with each of the first ends of the clip portions being hinged together and with each of the second ends of the clip portions further including a bar hingedly secured thereto, respectively, and with each bar having a terminal end. The terminal end of one of the bars is hingedly secured to the remaining bar proximate to its hinged securement to the clip portion. Thus, in use, upon joining the flanges together and positioning the grooves of the clip portions of the locking ring to receive the joined flanges and manipulating the remaining terminal end of the bar to tension the clip portions against the flanges of the housing the first section and the second section of the housing are secured together for use. Preferably, each flange of each of the sections of the housing is configured such that upon positioning the flanges together a band having sloped sidewalls (242,262) is formed. Each of the grooves formed in each of the clip portions has sloped inner sidewalls to receive therebetween the sloped sidewalls of the band such that in use upon tensioning the clip portions together the sloped inner sidewalls of the grooves forces together the flanges to thereby further tension the first section and the second sections of the housing together.

In another embodiment, the coupling means includes the first and the second sections of the housings each having a terminal end with one of the terminal ends of the first and the second sections of the housing including a flange and the remaining terminal end of the first and the second sections of the housing including a plurality of lugs radially extending therefrom. A clip ring (202) having a "U" sectional shape with a first and a second circumferential wall surface and with the clip ring positioned on one of the first and the second sections in a manner whereby the first circumferential surface blockingly contacts the flange to prevent removal of the clip ring from the housing. The second circumferential surface of the clip ring includes a plurality of notches formed therein such that in use the plurality of lugs of the housing are received through the plurality of notches and upon partially rotating the clip ring the plurality of lugs securely engage the second circumferential surface thereby securing the first section of the housing to the second section of the housing.

The present invention improves the helical gears, the filtering sieve and the coupling portion of the housing from the former juice maker.

The improved helical gears of the present invention are formed with the dedendum and the addendum in the same size, so that the clearance therebetween may be reduced to zero. Further, a pressure angle of the helical gear is provided in 28° to 30°, thereby forming a special tooth form. In addition, each helical gear is formed in a cylindrical shape, with a tapered screw at its terminal end and a shaft joined to the ends thereof in an integral form.

The improved filtering sieve of the present invention consists of a helical gear filtering portion and a tapered screw filtering portion. The screw filtering portion is provided with large holes, medium holes and small holes in the cited order, so that the crushed materials should be contacted with decreasing sizes of the holes as the pressure applied to the crushed materials increases. Meanwhile, the discharge hole for the dregs is closed with a flat spring, in such a manner that the dregs should be discharged only when the applied pressure reaches a certain level. Further, the tooth portions of the helical gears are made of stainless steel containing 3 to 4% of bio-ceramics, so that the nutrition in the crushed fibroid materials should not be destroyed. The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE DRAWINGS

For a thorough understanding of the nature and objects of the invention, reference should be had to the following detailed description taken in connection with the accompanying drawings in which:

FIG. 1 schematically illustrates the external structure of the juice maker according to the present invention;

FIG. 13 is a perspective view of the coupling portion of the juice maker;

FIG. 14 is a sectional view of a part of the coupling portion of the juice maker;

FIG. 15 illustrates the operation of the coupling portion of the juice maker;

FIG. 19 is a sectional view of a part of the clip; and

FIGS. 20A and 20B are plan views, in which FIG. 20A illustrates the state before fastening, and FIG. 20B illustrates the state before disassembling.

Similar reference characters refer to similar parts throughout the several views of the drawings.

DESCRIPTION OF THE PREFERRED EMBODIMENT

The constitution, operation and effects of the present invention will be described in detail referring to the attached drawings.

Figure 1:
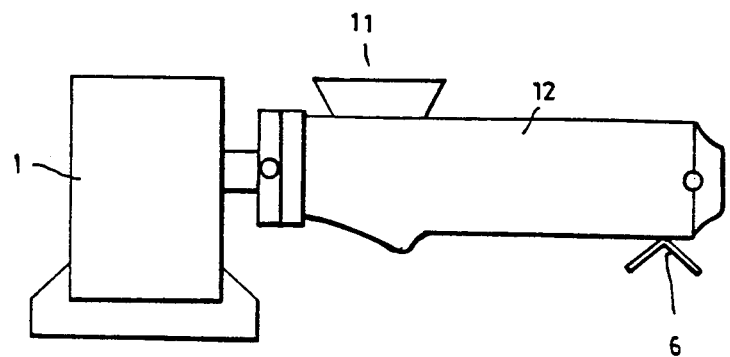

FIG. 1 illustrates the overall external appearance of the juice maker according to the present invention, and, as shown in this drawing, a working section is connected to a driving section 1. The working section is constituted such that helical gears are accommodated within a housing 12. Raw materials entering through an inlet 11 are crushed by the helical gears, and the dregs are pushed toward the right side of a blade portion 6 of the filtering sieve, while the juice is let to flow toward the left.

Figure 2A:
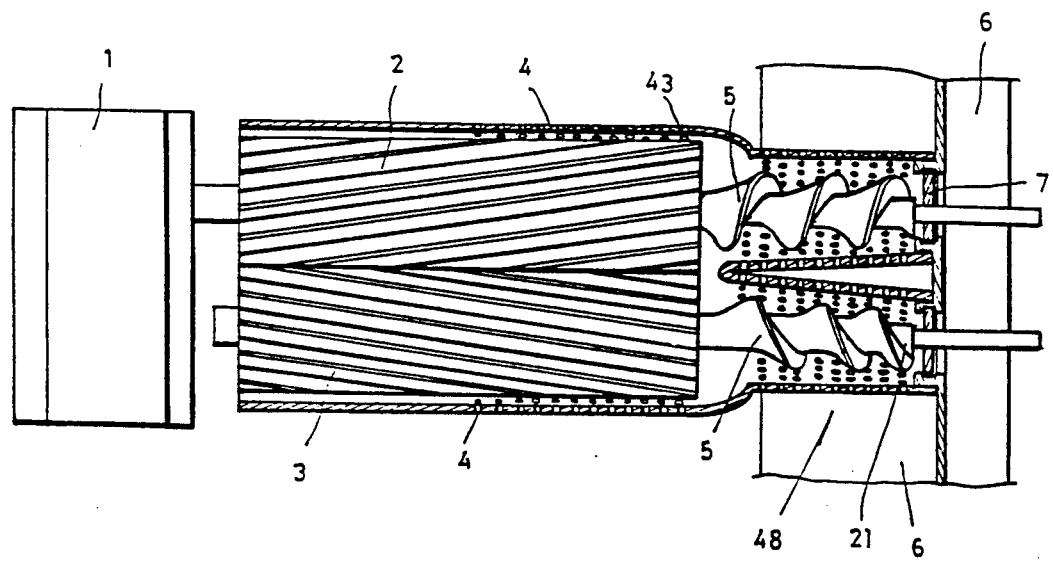
FIG. 2A illustrate the coupling between the two helical gears and the filtering sieve.

FIG. 2A is a schematic sectional view showing the helical gears and the filtering sieve in order to illustrate the juice maker of the present invention.

The driving section 1 includes a motor and reduction gears, for supplying rotating driving power to one of the helical gears.

A screw 5 extends from the position where the helical gear portion of the helical gear ends, and this screw takes a tapered form away from the helical gear. That is, the diameter of the screw decreases from the helical gear.

A filtering sieve 4 surrounds the screw portion and the helical gear portion of the helical gear. The filtering sieve is provided with a plurality of holes on a portion 43 which surrounds the helical gear portion, while the two filtering portions 47,48 which surround each screw portion, respectively, are provided with large, medium and small holes.

Below the filtering portion, a blade portion 6 is positioned. The blade portion is disposed closely to a dregs path and a juice path which are for transferring the dregs and juice after separation of them.

Surrounding the filtering sieve, there is installed a housing 12 which defines the position of the filtering sieve and supports the shafts of the helical gears, as well as making it possible to attach and detach the helical gears and the filtering sieve to and from the driving section.

The two helical gears mesh and rotate together to cut and crush the raw materials between the teeth thereof. The inlet 11 for the raw materials is disposed above the helical gear portion, and, when raw materials are fed into the inlet 11 they enter between the two helical gears to produce a mixture of crushed and cut raw juice containing material and extracted juice.

The mixture of the crushed and cut raw material is pushed toward each of the screws 5, and the juice is discharged to the outside of the filtering sieve 4. The rest of the crushed materials is further pushed by the two screws, and at the same time, additional juice is discharged to the outside through the filtering sieve. Meanwhile, the dregs are further compressed, and, when the compressing force exceeds a certain level, they are discharged to the outside through the discharge outlet formed in the sieve.

Figure 2B:
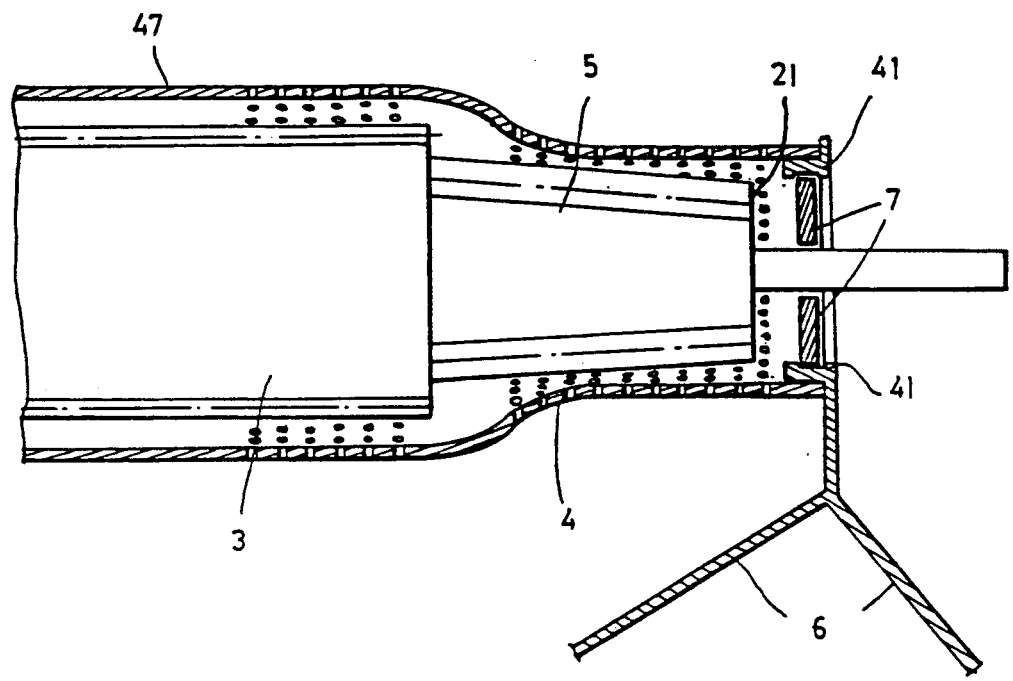
FIG. 2B is a side view showing the relation between the helical gears and the filtering sieve.
Figure 6:
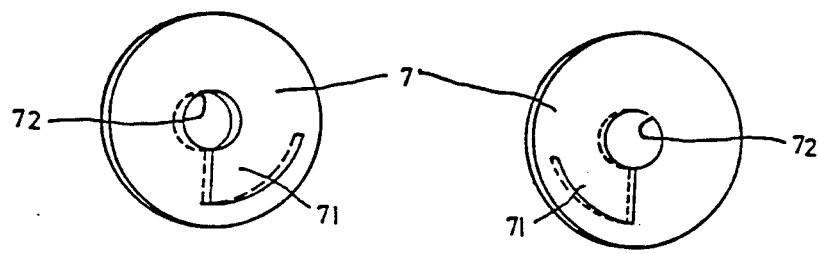
FIG. 6 is a perspective view showing the discharge portion of the filtering sieve.

FIG. 2B illustrates the filtering sieve in a vertical sectional view for clarity of the illustration. In the drawing, the circular disc 7 for the discharge outlet is illustrated at FIG. 6 in a perspective view. This disc can be fitted to the filtering sieve by means of a disc securing section 41, and its detachment from the filtering sieve can also be conveniently carried out.

The juice which is discharged through filtering sieve flows down the left side of the blade portion 6, while the dregs are discharged through the release outlet 71 which is formed in the circular disc 7, to the right side of the blade portion 6.

Figure 5:
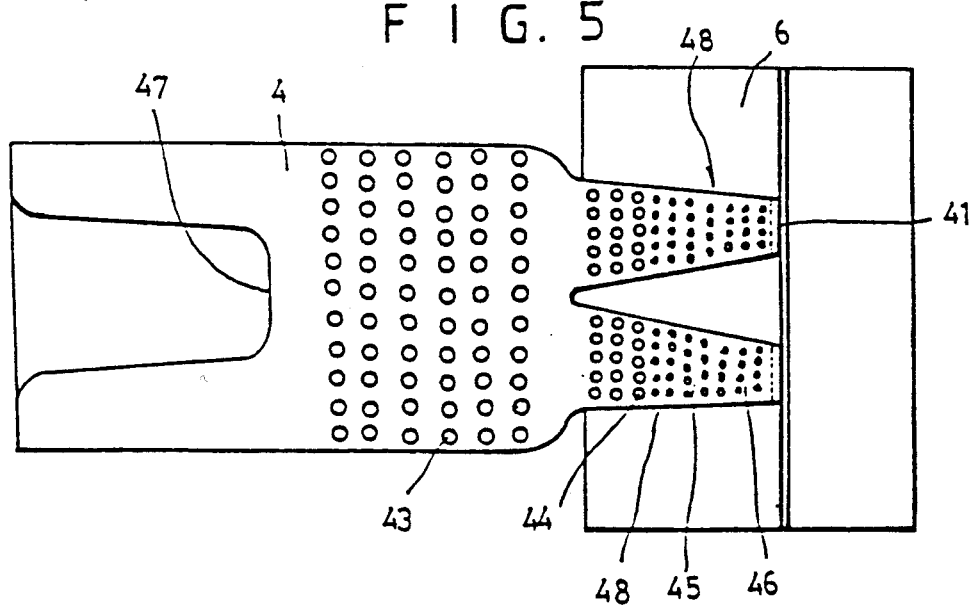
FIG. 5 illustrates the filtering sieve according to the present invention.

FIG. 5 illustrates the filtering sieve 4 with the filtering sieve 4 being provided with an opening 47 for receiving the raw materials therethrough, and with a plurality of holes formed to the right side thereof. Two screw filtering portions 47,48 extend from and branch from the helical gear filtering portion 43. The screw filtering portions 47,48 are provided with holes which gradually decrease in diameter toward the discharge outlet. Such gradual reductions of the sizes of the holes is provided because of the difference in pressure which is applied on the dregs as the dregs are being pushed by the screws to and through the discharge outlet.

The end portions of the screw filtering portions 47,48 are provided with a disc securing portion 41 for securing the circular disc 7 thereat as shown in FIGS. 2A, 2B, and 6. The disc 7 has a spring portion 71 and a hole 72 for accommodation of the helical gear shaft 53. The securing portion 41 and the circular disc have elastic structures, and therefore, when forcibly pushed in, they are inserted, while, if they are forcibly pulled out, they are detached. Thus, the circular disc can be "press-fit" into an operable position in the sieve. The reason for doing so is that the circular disc 7 has a spring portion 71 which enables the dregs to be discharged when the force holding the spring portion in a closed position is overcome. It is noted that the spring portion may have to be replaced if its tensioning ability is weakened, worn out, or if the adjustment of the elasticity has to be performed to enable different dregs to be forced therefrom, i.e. prevent clogging of the discharge outlet by some dregs.

Figure 3A:
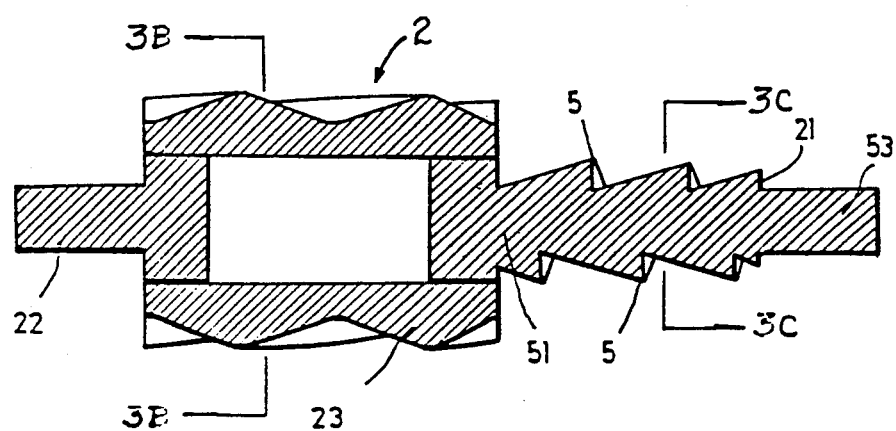
FIG. 3A is a sectional view of the helical gear according to the present invention.
Figure 3B:
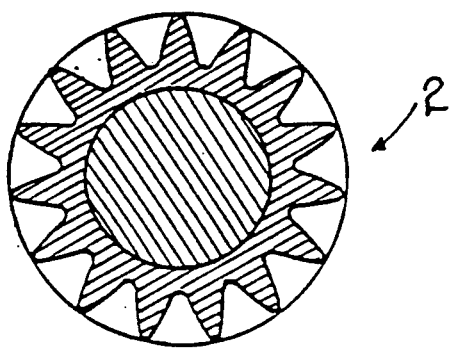
FIG. 3B is a sectional view taken along the line A—A of the helical gear of FIG. 3A.
Figure 3C:
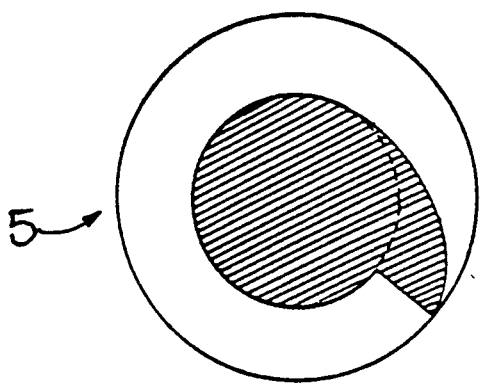
FIG. 3C is a sectional view taken along the line B—B of the helical gear of FIG. 3A.

FIG. 3A is a sectional view of the helical gears. FIG. 3B is a sectional view taken along the line A—A of FIG. 3A, and FIG. 3C is a sectional view taken along the line B—B of FIG. 3A.

The helical gear consists of a cylindrical helical gear portion 23 and terminates in a tapered screw. More specifically, the helical gear consists of a first shaft portion 22, a helical gear portion 23, a tapered screw portion 5 and a second shaft portion 51. The helical gear portion 23 is made of stainless steel containing 3 to 4% bio-ceramic in order to prevent the oxidation and decomposition of the juice during extraction.

Figure 4:
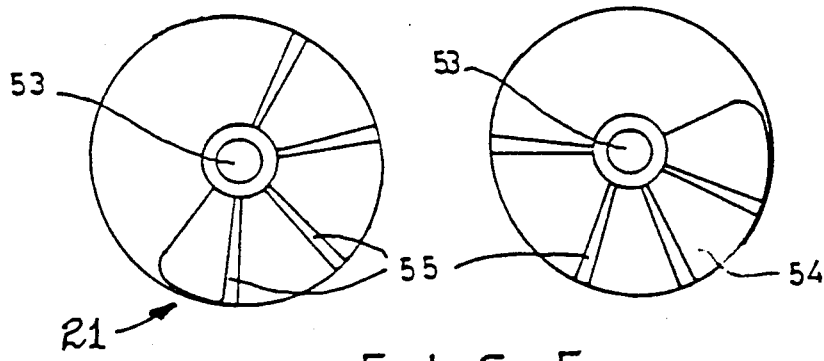
FIG. 4 illustrates the end portions of the screw portion helical gear.

FIG. 4 illustrates the end portion 21 of the tapered screw, on which a flat portion 54 is formed in an approximate vertical posture relative to the shaft 53. The flat portion 54 is provided with a convex rod portion 55 which extends perpendicular to the flat portion 54, and which plays a role in pushing out the dregs from the sieve.

Figure 8:
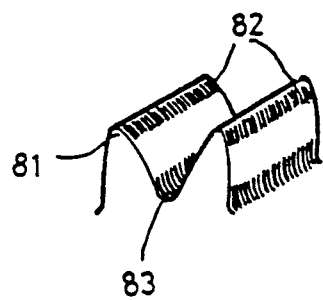
FIG. 8 illustrates the shape of the teeth of the helical gears.

FIG. 8 illustrates the shape of the teeth of the helical gear. The teeth 81 of the helical gear are formed with a pressure angle of 28° to 30°, and with the addendum and dedendum being made equal each other so as for the clearance between them to become zero. The end surfaces 82 and fillet portions 83 of the teeth are provided with slightly rough surfaces, and are provided with a plurality of pockmarks in a direction perpendicular to the gear shaft. Thus, upon rotation of the two meshing helical gears, there is no clearance between the teeth, and therefore, the fibroid materials entering into the helical gears must be crushed prior to being pushed out of the housing.

FIGS. 7A to 7E illustrate the meshing teeth during the process of crushing the fibroid materials comprising the raw juice containing material according to the present invention.

Figure 7A:
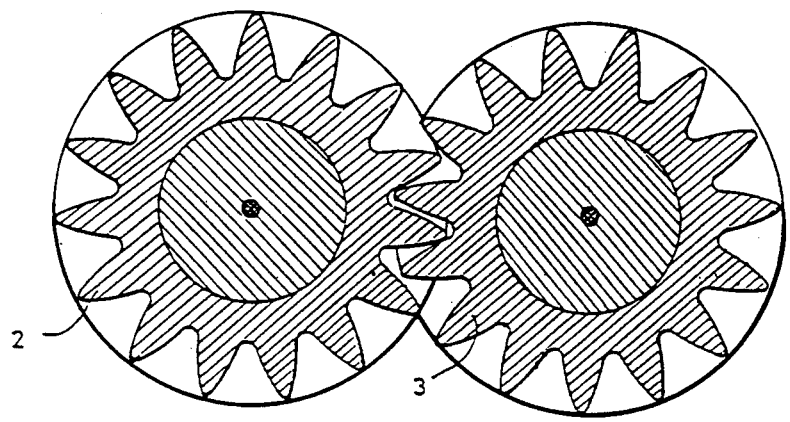
FIG. 7A illustrates the coupled state of the helical gears in order to show the method of the present invention.

FIG. 7A is a sectional view showing the meshed state of the two helical gears. When raw materials to be crushed, such as vegetables, fruits, cereals and the like, are fed through the housing inlet 11, the raw materials pass through the opening 47 (which is disposed on the left of the filtering sieve illustrated at FIG. 5) into the contact portions of the two helical gears. The end portions of the teeth of the helical gears are rough and angular in order to cut and crush the raw materials. The housing inlet 11 and the opening 47 in the sieve ensure are first cut into small pieces by the meshing teeth. Thereafter the cut and crushed raw materials are conveyed to the inter-teeth space for further action.

Figure 7B:
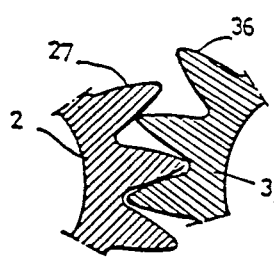
FIGS. 7B, 7C, 7D and 7E illustrate the process of crushing the raw materials.

As shown in FIG. 7B, the inter-teeth space is open so that the raw materials which are cut by the ends of tooth 36 and tooth 27 should be introduced into the inter-teeth space.

Figure 7C:
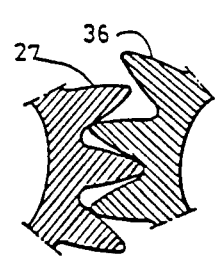

FIG. 7C illustrates a state in which the inter-teeth space narrows as the helical gears revolve. The cut raw materials are then squeezed to the extent of the reduction of the inter-teeth space to extract juice therefrom.

Figure 7D:
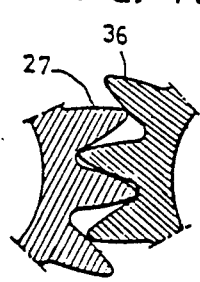

FIG. 7D illustrates a state in which the raw materials are sufficiently squeezed, and most of the juice is separated out, with only the fibroid materials remaining in the inter-teeth space.

Figure 7E:
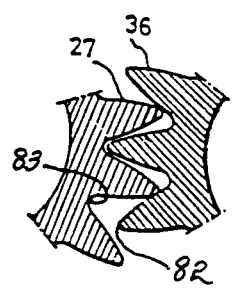

FIG. 7E illustrates a state in which the remaining fibroid materials are crushed between the end face 82 of the tooth and the fillet 83. The end face of the tooth and fillet are provided with a plurality of small depressions, i.e. pits or pockmarks, in a rough form, and therefore, the fibroid materials are held in the pockmarks. Further, when the two helical gears revolve, the clearance between meshing teeth disappears, and therefore, the fibroid materials are crushed into fine particles by being pressed between the end face and the fillet of the meshing teeth. Under this condition, the fibroid materials may be crushed down to a particle size of about 1 micron or less.

When the fibroid materials are crushed in the above described manner, additional nutritional matter contained within the fibroid materials is extruded out. Thus, the nutritional matter flows toward the screw together with the juice to be ultimately discharged through the filtering sieve.

The fibroid materials which are deprived of the nutritional mater and juice become dregs. The dregs are pushed toward the screws which in turn push the dregs toward the discharge outlet. However, the discharge outlet is biased in a closed position and as the dregs are continuously pushed toward the discharge outlet by the rotational force of the screws, the dregs are further compressed and squeezed so that the dregs release additional nutritional matter and juice. When the pressure reaches a predetermined point, the flat spring 71 of the circular disk which heretofore closed the discharge outlet succumbs to the pressure and opens thereby making a way for the discharge of the dregs.

The screw filtering portion of the filtering sieve is provided with a plurality of holes which become smaller in size when moving down the sieve toward the discharge outlet in order to maintain the dregs in the sieve as the pressure builds as the dregs are moved toward the discharge outlet. This decrease in hole size assists in prevention the dregs from being discharged through the holes of the filtering sieve which would be then mix with the juice. In addition, the circular disc 7 may be interchanged with another circular disc in order to vary the squeezing pressure required to open the discharge outlet. That is, different circular discs can be made to open at different pressures in order to insure that the apparatus does not clog up and complete extraction takes place depending on different kinds of raw materials.

Figure 9:
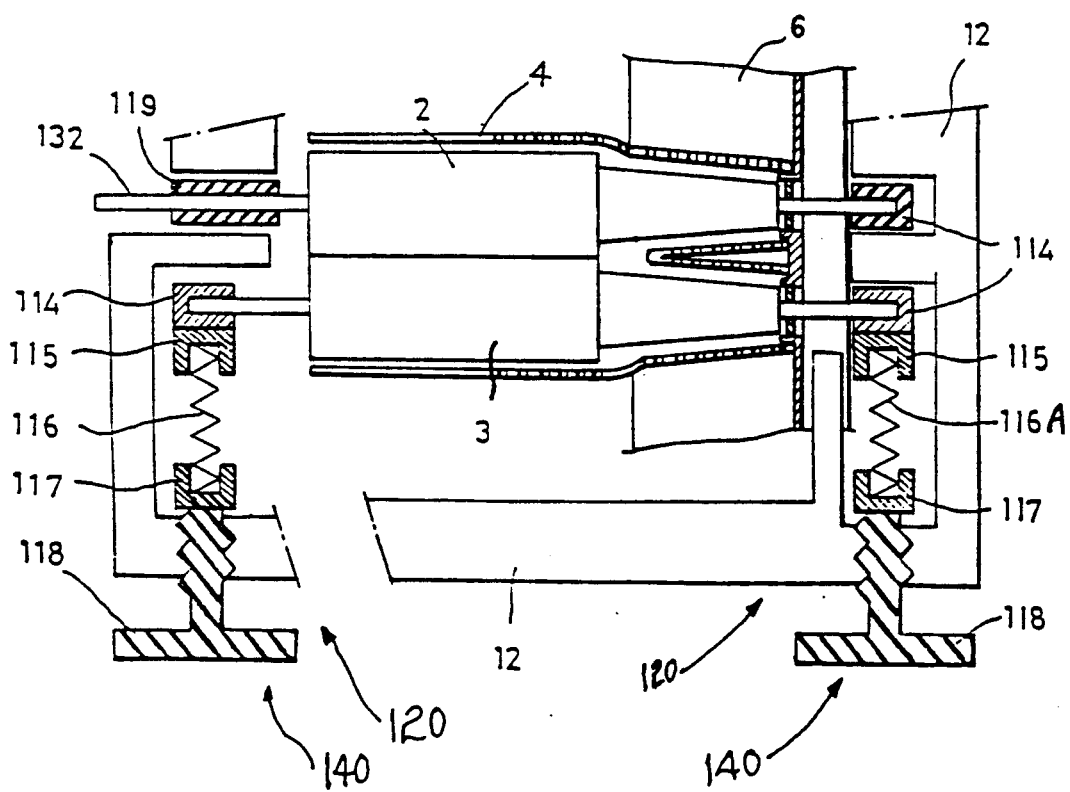
FIG. 9 illustrates the coupling and the close contact between the helical gears and the housing.

FIG. 9 illustrates the shafts of the helical gears rotatably supported in the housing. The helical gear 2 receives driving power, with the shaft 132 of the driving helical gear 2, which is secured in the housing 12.

The driven helical gear 3 is coupled with the housing 12 in such a manner that its shaft can be moved toward the driving helical gear 2, with the shaft of the driven helical gear 3 being pushed toward the driving helical gear all the time by a tensioning means. The shafts of both the driven and driving helical gears 3,2 are rotatably coupled with the housing 12 through bushings 114, 119, in such a manner that the shafts can be revolve smoothly.

The tensioning means 120 variably tensions the pair of helical gears against one another.

In one embodiment, the tensioning means 120 includes each of the helical gears terminating in a tapered screw having a shaft which extends axially from the helical gear and from the tapered screw, respectively, and with each of the shafts rotatably secured in the housing. A first 116 and a second 116A coil spring is tensioned against the shaft extending axially from the helical gear and the shaft extending axially from the tapered screw of the same gear as illustrated at FIG. 9. A forcing means 140 tensions each of the coil springs against the shafts extending axially from the helical gear and from the tapered screw, respectively.

In one embodiment of the forcing means 140, the housing includes a pair of internally threaded apertures formed therein to provide access to the shafts extending axially from the helical gear and from the tapered screw, respectively. The forcing means is a pair of screws with one of the screws being received in one of the internally threaded apertures and with the remaining screw being received into the remaining the internally threaded aperture. Thus, upon rotating the screws toward the coil springs, the screws engage the coil springs, respectively, and tension the helical gears together.

As shown in FIG. 9, the forcing means 140 requires two screws and the required springs etc., so that both ends of the shaft of the driven helical gear 3 can be tensioned.

In greater detail, the forcing means includes: springs 116, caps 115, 117 for covering the opposite ends of the springs, and screws 118 for engaging the spring. The spring 116 and the two caps 115, 117 are accommodated within an aperture formed in the housing 12. If the screw 118, which is disposed in the outer portion of the aperture of the housing 12, is rotated so as to engage and move against the spring, the spring is compressed so that the force of the spring 116 is transmitted to the respective shaft of the driven helical gear 3 with the result that the driven helical gear 3 is in close contact to the driving helical gear 2.

In another embodiment of the forcing means 140, a disc cam 105 is used. For sake of brevity only one disc cam 105 will be described although in practice one is used at each coil spring. The disc cam 105 includes a handle 151, a first stopper face 153 and a second stopper face 152. The disc cam 105 is pivotally secured to the housing by pin 154 so as to be in contact with the coil spring 116, to enable upon pivoting the disc cam 105 from a first position with the first stopper face in contact with the coil spring to a second position with the second stopper face in contact with the coil spring, the coil spring goes from a non-tensioned state to a tensioned state thereby tensioning the helical gears together, as see FIG. 10A.

Figure 10B:
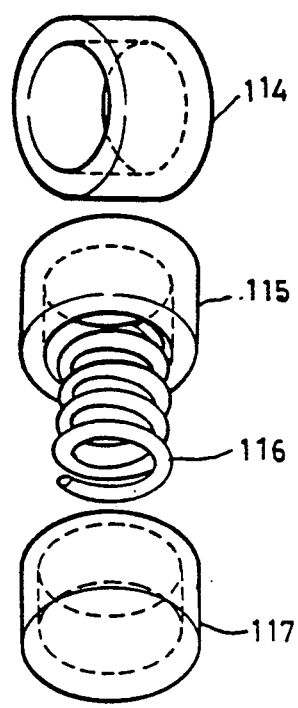
FIG. 10B is an exploded perspective view of a part of the second embodiment of the tensioning means.
Figure 10A:
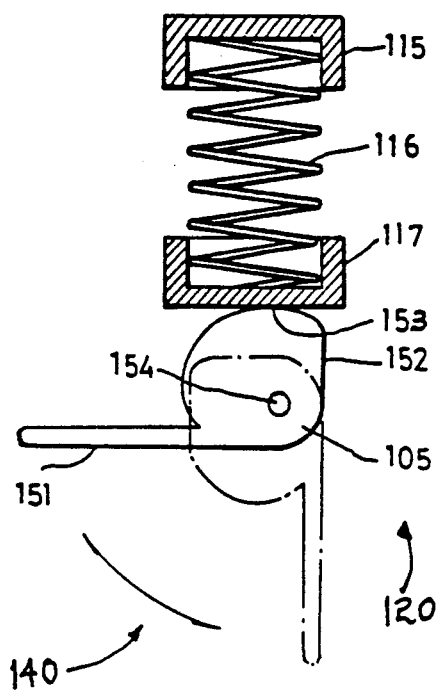
FIG. 10A illustrates one embodiment of the tensioning means.

In this embodiment, the spring and the two caps have the same constitution as that of the first embodiment with the only difference being that a disc cam 105 is used instead of the screw 118. In FIG. 10A, the position shown by the dotted line is the release position.

Figure 11A:
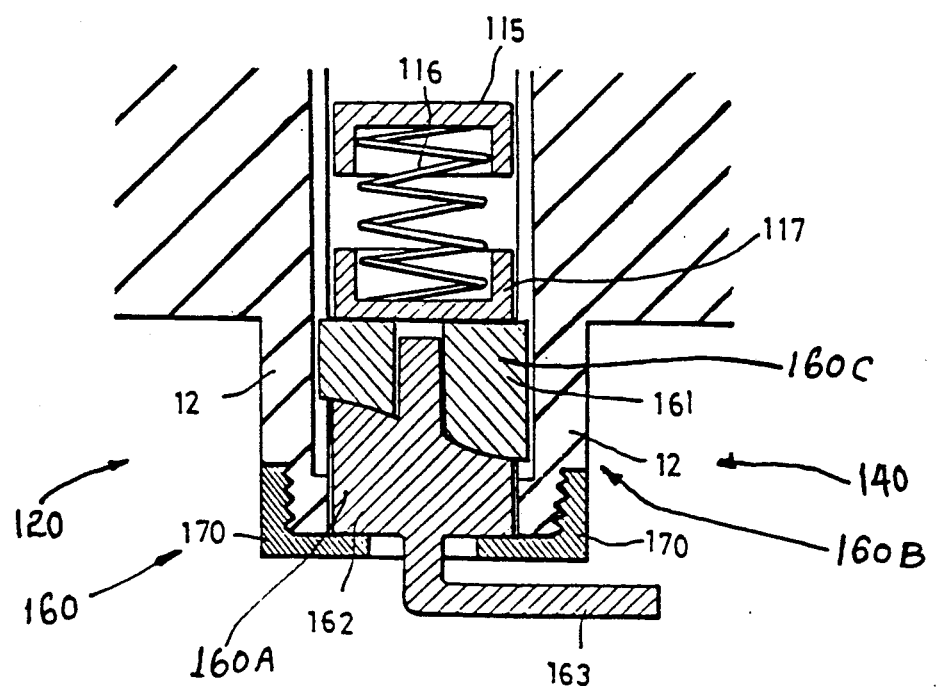
FIGS. 11A and 11B illustrate another embodiment of the tensioning means.
Figure 11B:
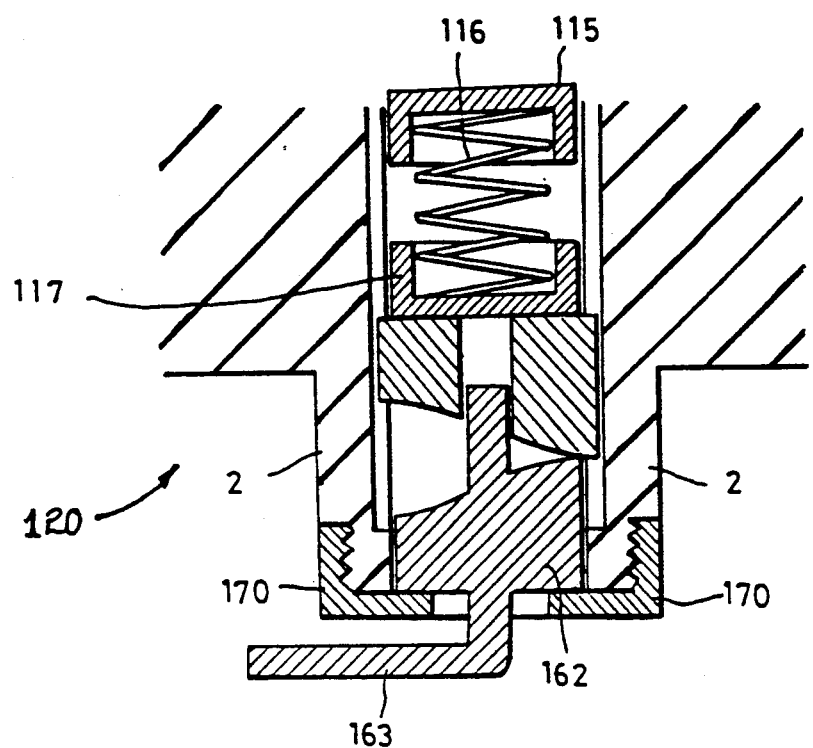
Figure 12:
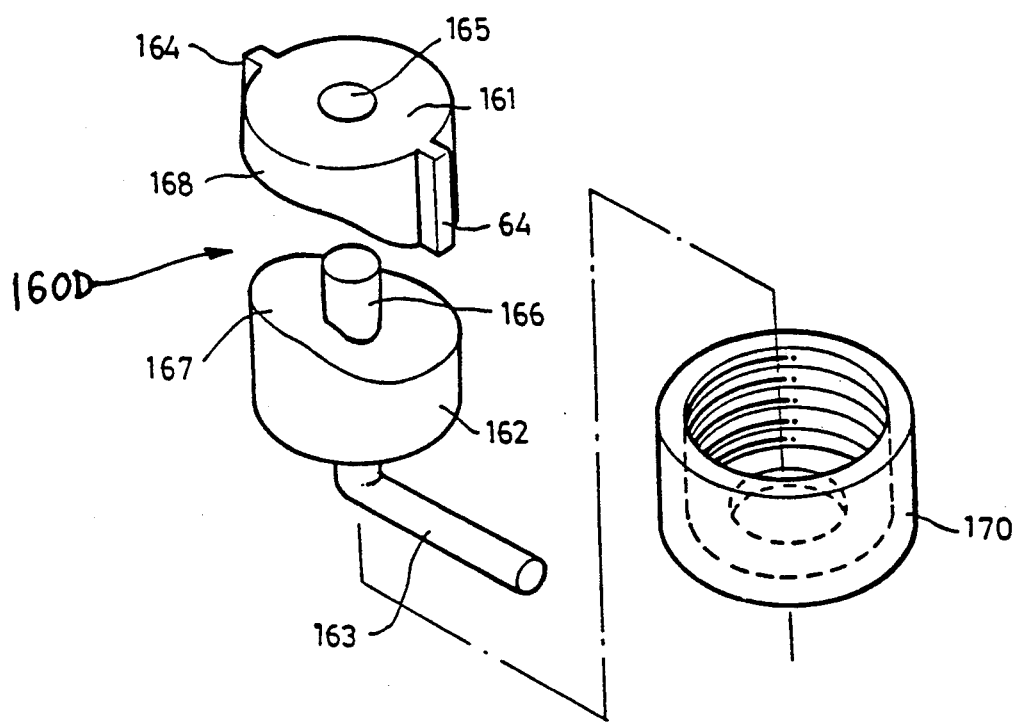
FIG. 12 is an exploded perspective view of the tensioning means.

FIGS. 11A and 11B illustrate another embodiment of the present invention with FIG. 12 being an exploded perspective view of a part of it. FIG. 11A illustrates a state in which the compression of the spring is released, i.e. the helical gears are essentially in a non-tensioned state. FIG. 11B illustrates the tensioned state of the tensioning means.

In this embodiment, the forcing means 140 includes a pair of rods, one for each spring 116, 116A. For sake of brevity only one rod 160 will be described although in practice one is used at each coil spring. The rod 160 has a first 160A, second 160C and mid portion 160B with the mid portion being served to define a pair of parallel sloped surfaces 160D and with the second portion of the rod being in contact with one of the coil springs and secured in the housing against rotation and with the first portion terminating in a handle 163. Thus, upon rotatably securing the first portion of the rod to the housing and rotating the handle from a first position, as illustrated at FIG. 11A, to a second position, as illustrated at FIG. 11B, the sloped surface of the first portion of the rod rotates against the sloped surface of the second portion of the rod pushing the second portion of the rod against the coil spring such that each the coil spring is tensioned against one of the shafts extending axially from the helical gear and from the tapered screw, respectively.

Preferably, the first portion of each of the rods are secured to the housing by a pair of caps 170 with each cap 170 having a hole formed therein for receiving therethrough the handle of the rod, respectively.

In greater detail, FIG. 12 illustrates the first portion 160A of the rod 160 or driving wheel 162, the second portion 160B of the rod or the driven wheel 161 and the screw cap 170. In this embodiment, the spring and the two caps take the same form as that of the first embodiment, and their functions are also same. Here the difference is that an end cam is used instead of the screw 118 of the first embodiment.

The driving wheel 162 of the end cam is provided with a handle 163, and the driving wheel 162 together with the screw cap 170 are inserted into a cylindrical hole of the housing 12, so that they cannot be detached. The driven wheel 161 is provided with a circular hole 165 formed therein which is matched with a circular projection 166 of the driving wheel 162 to prevent disengagement during use. The driven wheel 161 is also provided with a rotation preventing blade portion 164 at each side of the circumference.

The driving wheel 162 and the driven wheel 161 include parallel sloped surfaces 160D with a flat face 167 for enabling the static positioning of the surfaces so that the spring is in a tensioned position.

If the handle 163 of the driving wheel is turned, the driving wheel rotates relative to the driven wheel, so that the driven wheel is pushed toward the spring. Consequently, the force of the spring pushes the driven helical gear toward the driving helical gear, with the result that the driving and driven helical gears are meshed together without leaving any clearance between the teeth of the two gears.

FIG. 13 is a partial illustration of the housing divided into a first section 201 (driving section) and a second section 203 (working section). The first section includes the power means and the second section includes the helical gears. In this embodiment the first section is separable from the second section by a coupling means 400 for operatively securing the first section of the housing to the second section of the housing when desired. As shown the driving section 201 and the working section 203 are coupled together by means of a clip ring 202 which is illustrated in detail at FIG. 14.

FIG. 14 is a sectional view, in detail, of part of the coupling portion. The cross section of the clip ring 202 is U shaped.

In one embodiment of the coupling means 400 the first 201 and the second 203 sections of the housings each include a terminal end and one of the terminal ends of the first and the second sections of the housing including a flange 213 and the remaining terminal end of the first and the second sections of the housing includes a plurality of lugs 231 radially extending therefrom. A clip ring 202 with a "U" sectional shape is used to couple the two sections together. The clip ring has a first 202A and a second 202B circumferential surface (walls) with the clip ring positioned on one of the first and the second sections in a manner whereby the first circumferential surface blockingly contacts the flange 213 to prevent removal of the clip ring from the housing 201. The second circumferential surface 202B of the clip ring includes a plurality of notches 223 formed therein such that in use the plurality of lugs 231 of the housing are received through the plurality of notches 223 and upon partially rotating the clip ring 202 the plurality of lugs securely engage the second circumferential surface 202B to secure the first section of the housing to the second section of the housing.

The leading end portion of the housing 201 of the driving section is cylindrical in shape with its outer circumference having a stepped shape consisting of a upper step wall 201A and a lower wall 201B. On the lower step wall 201B, there is attached a flange 213 having a half ring shape by means of a securing piece 214. The inner end portion 224 of the clip ring is rotatably disposed within the space between the flange 213 and the upper step wall 201A of the housing. The space between the flange and the upper step wall can be adjusted by changing the cross sectional size of the flange or by moving the flange either closer to or further away from the upper wall 201A by moving the securing piece, such as a screw, inward or outward, respectively. Therefore, the tightness of the coupling between the driving section housing and the working section housing can be adjusted. A small flange portion 212 is formed on the outer circumference of the leading end portion of the driving section housing, and this is for expanding the area of the contact with the working section housing, as well as reinforcing the attachment state of the adjusting ring.

Figure 18:
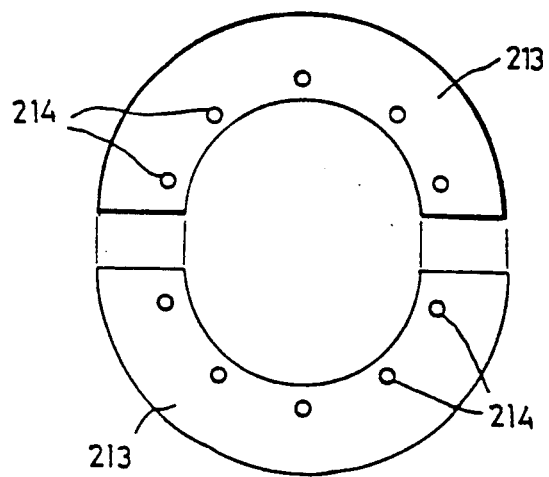
FIG. 18 is a plan view of a semi-circular adjusting plate.

The constitution of the half ring shaped flange 213 is illustrated at FIG. 18.

Figure 16A:
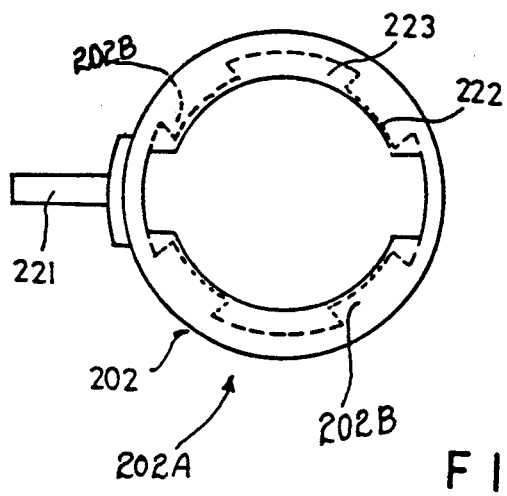
FIGS. 16A and 16B are perspective views of the clip ring.
Figure 16B:
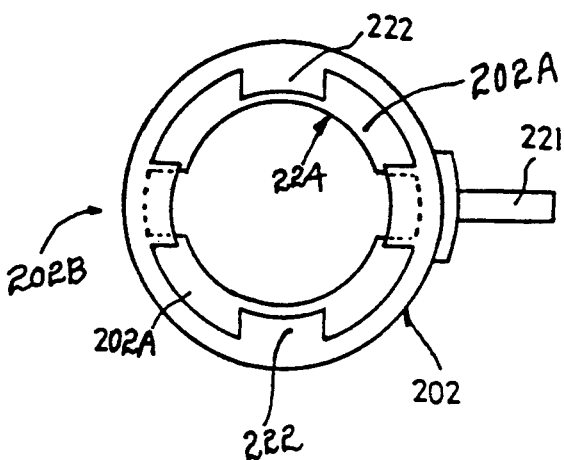

The clip ring 202 is further illustrated in FIGS. 16A and 16B in rear and frontal views showing the first 202A and a second 202B circumferential surfaces, respectively. The first 202A circumferential surface is a wall. The second 202B circumferential surface is provided with four notches 223 and four projections 222. The clip ring 202 is further provided with a handle 221 in such a manner that the clip ring 202 can be turned.

Figure 17:
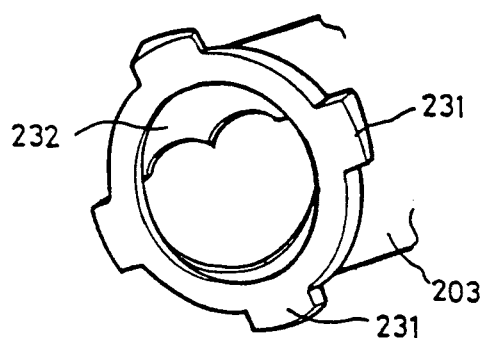
FIG. 17 is a perspective view of the leading end portion of the working section housing.

The terminal end of the working section housing 203 is illustrated in FIG. 17 in a perspective view. The terminal end of the working section housing is provided with a plurality of wedge-shaped projections or lugs 231 (e.g. in the number of 4) on the outer circumference thereof. A position orientating portion 232, used during the coupling procedure to align the housings when being put together, is formed on the inner circumference thereof. The height of each of the lugs is uniform, but are preferably formed in a wedge shape as illustrated.

The coupling of the clip ring is carried out in the manner described below. The clip ring is coupled with the driving section housing in such a manner as to be rotatable within a certain angular range. The plurality of lugs of the working section housing are fitted into the notches 223 of the clip ring, and then, the clip ring is rotated by turning handle 221. The projections 222 of the clip ring, i.e. the second circumferential surface between the notches, then contact with the thin portions of the lugs 231 of the working section housing, and then, the projections 222 are slid to the thick portions of the projections 231, with the result that the working section housing is securely and closely contacted with the driving section housing.

Another embodiment of the coupling means 400 is illustrated at FIGS. 19, 20A, and 20B. For sake of clarity the driving section housing and the working section housing are referred to by reference numerals 204 and 206, respectively, since they are of a different structure than the coupling means at FIGS. 13–18.

FIGS. 20A and 20B illustrate a clip ring 205 which is used in coupling the driving section housing 204 with the working section housing 206. The locking ring 205 consists of two semi-circular clip portions 251,252 and an "X" shaped lock link ring device 240. If the lock link ring device is set to an open position, the semi-circular clip portions 251,252 are spread apart. However, if it is set to a lock position, the clip portions 251,252 are drawn together.

In this embodiment, the coupling means 400 includes the first 204 and the second 206 sections of the housing each including a terminal end with each terminal end having a flange 242, 262 formed thereat. A locking ring 205 having a pair of clip portions 251,252 with each the clip portions having an inner surface with a groove 250 formed therein for receiving into the grooves each of the flanges 242,262 of the first and the second sections of the housing. A closing means 240 secures the clip portions 251,252 together such that in use each of the flanges are received into each of the grooves of the clip portions of the locking ring and forced together to thereby securely interconnect the first section 204 and the second section 206 of the housing together.

Preferably the closing means comprises the clip portions each having a first 251A, 252A and a second 251B,252B end, respectively, with each the first ends 251A,252A of the clip portions being hinged 258 together. The first ends 251A,252A of the clip portions further include a bar 253,254 hingedly secured thereto, respectively. Each 253,254 bar has a terminal end 253A,254A and with the terminal end of one of the bars, in this case 254, being hingedly secured 256 to the remaining bar 253 proximate to its hinged securement 257 to the clip portion. Thus, upon joining the flanges of the housings together and positioning the grooves of the clip portions of the locking ring to receive the joined flanges and manipulating the remaining terminal end of the bar 253 the clip portions are drawn up or tensioned against the flanges of the housing to secure the working section and the driving section of the housing together.

Preferably, each of the flanges of each of the housing is configured such that upon positioning the flanges together a beveled band having sloped sidewalls is formed as illustrated at FIG. 19. In this case each groove formed in each the clip portions has a sloped inner sidewalls 250A to receive therebetween the sloped sidewalls of the beveled band. Thus, upon tensioning the clip portions together the sloped inner sidewall of the grooves forces together the flanges to thereby further tension the working section and driving sections of the housing together.

FIG. 19 illustrates a sectional view of the semi-circular clip portions, the driving section housing 204 and the working section housing 206. This embodiment may also be described as the semi-circular clip portion being provided with a trapezoidal slot 259, while the outer circumferences of the leading end portions of the working section and the driving section are provided with sloped flange portions 242,262.

The mating faces are non-flat faces, and the leading end portion 241 of the driving section has a recessed shape on its central portion, while the leading end portion 261 of the working section has a projected shape. If the two flanges are matched, they form a trapezoidal shape, so that the trapezoidal shape should be fit to the trapezoidal slot of the semi-circular clip portion. In other words, the cross section of each of the flanges takes the shape of a half of the trapezoidal slot.

The process of coupling the driving section housing with the working section housing by means of the clip will be described below.

First the handle, i.e. the free end of bar 253, is set to an open position, and then, the flanges of the driving section and the working section are matched together and the groove 250 is positioned with the matched flanges therein. The handle is then moved toward the housing causing the clip portions to be drawn together to from the lock position of the coupling means 400.

To open the locking clip, the handle is merely moved in the opposite direction to free the locking clip and allow the separation of the respective housing sections.

According to the present invention as described above, it is possible to crush the fibroid materials down to a particle size of 1 micron or less, and to extract the nutrition from the fibroid materials in the form of juice. Further, it is simple and convenient to assemble and disassemble the apparatus of the present invention, and the addition of a bioceramic on the helical gears prevents the extracted juice from being oxidized during the extraction process.

With regard to manufacturing the helical gear(2,3), it is preferred that the helical gear portion 23 be hallow. This enables the first shaft portion 22 and the second shaft portion to be separately produced and to be coupled to the hallow cavity of the helical gear which itself can be cast as a separate unit. This results in a low cost helical gear (2,3) which is easy to produce relative to a single piece helical gear (2,3).

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An apparatus for extracting juice from raw juice containing material, said apparatus comprising:
    a housing for supporting said apparatus and including a raw juice containing material inlet;
    a pair of meshing helical gears (2,3) with each said helical gear terminating in a tapered screw, including a plurality of teeth each tooth of which is formed with an addendum and a dedendum which are equal to each other to enable zero clearance between meshing teeth, and being rotatably secured in said housing to enable in use raw juice containing material to be supplied through said inlet of said housing to said pair of meshing helical gears for crushing said raw juice containing material to initially extract juice therefrom;
    a sieve (4) operatively positioned around said helical gears and each said tapered screws for enabling in use filtering and draining away from said helical gears and said tapered screws juice extracted by said helical gears and said tapered screws and with said sieve being branched (47,48) each branch housing at least a portion of one of said tapered screws, respectively, and with each branch of said sieve having a terminal end with a discharge outlet formed thereat to enable each said screw to further extract juice from said crushed raw juice containing material by compressingly moving said crushed juice containing material along one of said branch portions of said sieve and toward one of said discharge outlets formed in said sieve, and
    a power means (1) for supplying rotational output to said helical gears and said tapered screws such that in use said raw material supplied through said inlet is moved along said helical gears to one of said tapered screws, along one of said tapered screws and through one of said outlets formed in said sieve.

2. The apparatus of claim 1, wherein said sieve has an outlet disc (7) positioned at each said terminal end of each said discharge outlet with said outlet disc tensioned in a closed position thereby closing off said discharge outlet such that in use said tapered screw continually forces said crushed material against said outlet disc thereby further extracting juice from said crushed material until overcoming the force tensioning said tensioned outlet disc in said closed position to thereby open said discharge outlet to enable the discharging of said juice extracted material from said outlet of said housing.

3. The apparatus of claim 2, wherein said sieve operatively positioned around each said tapered screw is provided with large holes proximate said helical gears and small holes proximate each said outlet of said sieve with medium sized holes therebetween to enable in use said juice extracted raw material to be compressingly moved by each said screw toward said discharge outlet and to be retained within said sieve prior to being forced from said outlet of said housing while simultaneously allowing juice made available by said compression to drain from said sieve operatively positioned around each said tapered screw.

4. The apparatus of claim I wherein each tooth of said plurality of teeth of said helical gears further include an end surface (82) and a fillet portion (83) which are provided with slightly rough surfaces and a plurality of pockmarks in a direction perpendicular to the gear shaft to provide in use enhanced juice extraction by further pulverizing said raw juice containing material.

5. The apparatus of claim 1 wherein each said helical gear is made of stainless steel having about 3 to 4% bio-ceramic to prevent oxidation and decomposition of the juice during contact with said helical gears.

6. The apparatus of claim 1 further including a blade (6) having a first side and a second side and being positioned proximate said discharge outlets of said sieve to enable said juice extracted from said juice containing raw material to flow on to said first side of said blade and said juice extracted material discharged from said outlets formed in said sieve to flow on to the second side of said blade thereby separating said juice and said juice extracted material to enable separate collection thereof.

7. The apparatus of claim 1 further including a tensioning means for variably tensioning said pair of helical gears against one another.

8. The apparatus of claim 7 wherein said tensioning means includes each said helical gear terminating in a tapered screw having a shaft extending axially from said helical gear and from said tapered screw, respectively, and with said shafts being rotatably secured in said housing;
    a first and a second coil spring tensioned against said shaft extending axially from said helical gear and said shaft extending axially from said tapered screw, respectively; and
    a forcing means to tension each said coil spring against said shafts extending axially from said helical gear and from said tapered screw.

9. The apparatus of claim 8 wherein said housing includes a pair of internally threaded apertures formed therein to provide access to said shafts extending axially from said helical gear and from said tapered screw, respectively; and said forcing means is a pair of screws with one of said screws being received in one of said internally threaded apertures and with the remaining screw being received into the remaining said internally threaded aperture, such that upon rotating said screws, said screws engage said coil springs, respectively, and tension said helical gears together.

10. The apparatus of claim 8 wherein said forcing means is a disc cam with a handle (151), a first stopper face (153) and a second stopper face (152) with said disc cam being pivotally secured to said housing so as to be in contact with said coil spring such that in use upon pivoting said disc cam from a first position with said first stopper face in contact with said coil spring to a second position with said second stopper face in contact with said coil spring, said coil spring goes from a non-tensioned state to a tensioned state thereby tensioning said helical gears together.

11. The apparatus of claim 8 wherein said forcing means includes a pair of rods having a first, second and mid portion with each said mid portion of said rods being served to define a pair of parallel sloped surfaces and with said second portion of each said rod being in contact with one of said coil springs and secured in said housing against rotation and with said first portion terminating in a handle, respectively, such that in use upon rotatably securing said first portion of said rod to said housing and rotating each said handle from a first position to a second position said sloped surface of said first portion of said rod rotates against said sloped surface of said second portion of said rod pushing said second portion of said rod against said coil spring such that each said coil spring is tensioned against one of said shafts extending axially from said helical gear and from said tapered screw, respectively.

12. The apparatus of claim 11 wherein said first portion of said rods are secured to said housing by a pair of caps with each cap having a hole formed therein for receiving therethrough said handle of one of said rods.

13. The apparatus of claim wherein said housing is divided into a first section and a second section with said first section including said power means and said second section including said helical gears and with said first section being separable from said second section to enable cleaning of said second section of said housing apart from said first section of said housing; and a coupling means for operatively securing said first section of said housing to said second section of said housing.

14. The apparatus of claim 13 wherein said coupling means includes said first and said second sections of said housing each including a terminal end with each terminal end having a flange formed thereat;

a locking ring having a pair of clip portions with each said clip portions having an inner surface with a groove formed therein for receiving into said grooves each said flange of said first and said second sections of said housing; and a closing means for securing said clip portions together such that in use each said flange is received into each said groove of each said clip portion of said locking ring and forced together to thereby securely interconnect said first section and said second section of said housing together for use.

15. The closing means of claim 14 wherein said clip portions each have a first and a second end, with each said first ends of said clip portions being hinged together and with each said second ends of said clip portions further including a bar hingedly secured thereto, respectively, and with each bar having a terminal end and with said terminal end of one of said bars being hingedly secured to the remaining bar proximate to its hinged securement to said clip portion such that in use upon joining said flanges together and positioning said grooves of said clip portions of said locking ring to receive said joined flanges and manipulating the remaining terminal end of said bar to tension said clip portions against said flanges of said housing to thereby secure said first section and said second section of said housing together for use.

16. The closing means of claim 14 wherein each said flange of each said housing is configured such that upon positioning said flanges together a beveled band having sloped sidewalls is formed; and each said groove formed in each said clip portions having a sloped inner sidewall to receive therebetween said sloped sidewalls of said beveled band such that in use upon tensioning said clip portions together said sloped inner sidewall of said grooves forces together said flanges to thereby further tension said first section and said second sections of said housing together.

17. The apparatus of claim 13 wherein said coupling means includes said first and said second sections of said housings each includes a terminal end and one of said terminal ends of said first and said second sections of said housing includes a flange and the remaining terminal end of said first and said second sections of said housing includes a plurality of lugs radially extending therefrom;

an clip ring (202) having a "U" sectional shape with a first and a second circumferential surface with said clip ring positioned on one of said first and said second sections in a manner whereby said first circumferential surface blockingly contacts said flange to prevent removal of said clip ring from said housing; and said second circumferential surface of said clip ring including a plurality of notches formed therein such that in use said plurality of lugs of said housing are received through said plurality of notches and upon partially rotating said clip ring said plurality of lugs securely engage said second circumferential surface thereby securing said first section of said housing to said second section of said housing.

18. The apparatus of claim 1, wherein said helical gear comprising:

a hollow helical gear portion (23);

a first shaft portion (22);

a second shaft portion (51) with a screw formed thereon, and said first and second shaft portions being consolidated integrally with said helical gear portion.

19. The apparatus of claim 1, wherein said tapered screw of said helical gear has an end portion (21) with a flat portion (54) in a direction perpendicular to the axis of said screw and said flat portion is provided with one or more of projected portions (55) in a direction perpendicular to the axis of said screw.

20. The apparatus of claim 1, wherein each tooth is formed with a presure angle of about of about 28° to 30°.

21. A method for extracting and separating juice and entrapped nutritional matter from juice containing raw material, comprising: providing an apparatus comprising a pair of helical gears with each helical gear terminating in a tapered screw, a sieve (4) with a pair of discharge outlets formed therein and with an outlet disc (7) biased in a closed position and located at the discharge outlets, wherein the method comprises the steps of:

introducing the raw juice containing material between rotating helical gears;

crushing the raw juice containing material by the helical gears to initially extract juice therefrom while simultaneously conveying the crushed raw juice containing material toward the tapered screws;

collecting the juice and entrapped nutritional matter extracted thereby;

compressing the crushed raw materials to further extract juice therefrom by compressingly moving the crushed juice containing material along the sieve and toward the discharge outlets formed in the sieve by the rotating tapered screws;

further collecting the juice and entrapped nutritional matter extracted thereby; and forcing the crushed raw materials against the outlet disc to insure complete extraction of the juice, to force open the outlet disc, to discharge the dregs external to the apparatus and to finally collect the juice and entrapped nutritional matter extracted thereby.

* * * * *

REEXAMINATION CERTIFICATE (2649th)
United States Patent [19]
Lee

[11] B1 5,156,872
[45] Certificate Issued Aug. 8, 1995

[54] JUICE EXTRACTOR

[76] Inventor: Moon H. Lee, 17/3 Sajik 1-Dong, Dongrae-Gu Busan, Rep. of Korea

Reexamination Request:
No. 90/003,329, Feb. 2, 1994

Reexamination Certificate for:
Patent No.: 5,156,872
Issued: Oct. 20, 1992
Appl. No.: 827,431
Filed: Jan. 29, 1992

[30]     Foreign Application Priority Data

Feb. 13, 1991 [KR] Rep. of Korea ............ 91-2168
Feb. 22, 1991 [KR] Rep. of Korea ............ 91-2911
Feb. 28, 1991 [KR] Rep. of Korea ............ 91-3304

[51] Int. Cl.$^6$ .................. A23L 1/212; A23L 2/06; A23N 1/00
[52] U.S. Cl. .................. 426/489; 99/495; 99/510; 99/513; 100/37; 100/98 R; 100/117; 100/145; 241/101.2; 241/260.1; 241/261; 366/84; 366/272; 366/301; 426/481
[58] Field of Search ............ 99/489, 495, 510–513; 100/37, 98 R, 117, 145; 366/84, 272, 301; 426/481, 489

[56]     References Cited
FOREIGN PATENT DOCUMENTS 56-108813 8/1981 Japan .
59-26903 8/1984 Japan .
59-26904 8/1984 Japan .
914356 6/1991 Rep. of Korea .

OTHER PUBLICATIONS

Korean Utility Model Application No. 89-6067 which was available for Public Inspection on Dec. 12, 1990.
Korean Utility Model Laid Open Gazette No. 90-19704 which was laid open to the public on Dec. 12, 1990.
Green Power Juice Extractor Model (Lot) No. TH-103, *Monthly Natural Health*, No. 11, published Sep. 1, 1990.
Green Power Juice Extractor Model (Lot) No. TH-103, *Monthly Natural Diet*, No. 102, published Sep. 1, 1990.
Green Power Juice Extractor Model (Lot) No. TH-103, *Monthly Natural Diet*, No. 106, published Jan. 1, 1991.
Green Power Juice Extractor Model (Lot) No. TH-103, *Monthly Natural Diet*, No. 107, published Feb. 1, 1991.
Green Power Company Catalog relating to Model (Lot) No. TH-103 (undated).
Copies of Invoices which were issued for Model No. TH-103 on Sep. 25, 1990, Oct. 15, 1990, Nov. 20, 1990, Dec. 10, 1990, Jan. 16, 1991 and Jan. 24, 1991, respectively.

*Primary Examiner*—Timothy F. Simone

[57]     ABSTRACT

An apparatus and method for extracting juice from raw juice containing material is disclosed. The apparatus includes a supporting housing, a pair of meshing helical gears (2,3) for crushing the raw juice containing material to initially extract juice therefrom and with each helical gear terminating in a tapered screw. A sieve (4) is operatively positioned around the helical gears and each of the tapered screws with the sieve being branched (47,48) with each branch housing at least a portion of one of the tapered screws, respectively. Each branch of the sieve has a terminal end with a discharge outlet formed thereat to enable each of the screws to further extract juice from the crushed raw juice containing material by compressingly moving the crushed juice containing material along one of the branch portions of the sieve and toward one of the discharge outlets formed in the sieve. An outlet disc (7) is positioned at the discharge outlets and is biased in a closed position thereby taking advantage of the compressive forces to further squeeze juice from the crushed material until the force tensioning the tensioned outlet disc is overcome and such material is discharged from the housing. A power means (1) supplies rotational output to the helical gears and the tapered screws.

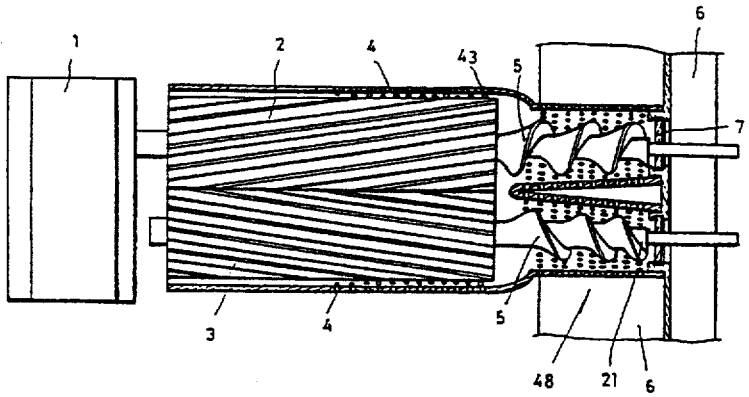

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 10–17 and 19 is confirmed.

Claims 1-9, 18, 20 and 21 are cancelled.

* * * * *